United States Patent [19]
Dulaney, III et al.

[11] Patent Number: 5,416,473
[45] Date of Patent: May 16, 1995

[54] CALENDAR DRIVEN SELECTIVE CALL MESSAGING SYSTEM AND OPERATING METHOD

[75] Inventors: Harry G. Dulaney, III, Boca Raton; Gregg E. Rasor, Boynton Beach; Robert J. Schwendeman, Pompano Beach; James C. Page, Lake Worth, all of Fla.

[73] Assignee: Motorola, Inc., Schaumburg, Ill.

[21] Appl. No.: 11,571

[22] Filed: Feb. 1, 1993

[51] Int. Cl.⁶ .................................................. G08B 5/22
[52] U.S. Cl. ............................ 340/825.44; 340/825.27
[58] Field of Search ................... 340/825.44, 825.22, 340/825.21, 311.1, 309.15, 309.5; 379/56, 57, 128; 455/38.2, 92; 364/705.08, 705.07, 705.05, 143, 144, 145; 368/10, 13, 251

[56] References Cited

U.S. PATENT DOCUMENTS

| | | | |
|---|---|---|---|
| 4,162,610 | 7/1979 | Levine | 368/10 |
| 4,380,009 | 4/1983 | Long et al. | 340/825.44 |
| 4,644,351 | 2/1987 | Zabarsky et al. | 340/825.44 |
| 4,812,843 | 3/1989 | Champion, III et al. | 379/57 |
| 4,856,047 | 8/1989 | Saunders | 340/825.44 |
| 5,043,721 | 8/1991 | May | 340/825.44 |
| 5,257,307 | 10/1993 | Ise | 379/57 |

Primary Examiner—Donald J. Yusko
Assistant Examiner—Edwin C. Holloway, III
Attorney, Agent, or Firm—Gregg E. Rasor

[57] ABSTRACT

An electronic information processing device (300) capable of communicating a message to a paging terminal (112) uses an input device (309) to enter the message, select a messaging subscriber and their corresponding selective call address identifier, and schedule communication of the message to the paging terminal (112) for transmission to at least one selective call receiver corresponding to the selected messaging subscriber. The device uses a micro-controller (301) including at least one electronic memory (304, 305, 306) and a processor (303), to execute a program that controls operation of the device (300), maintain a registry of messaging subscribers (400) in the memory (304, 305, 306), and implement a real-time calendar for effecting communication of a selective call address identifier and corresponding message to the paging terminal (112) via a data port (308) in response to a scheduled communication of the message.

20 Claims, 5 Drawing Sheets

| Alias | Subscriber name | Address identifier |
|---|---|---|
| John | Wright, John | 042092 |
| Bill | Davis, William | 002258 |
| Bob | Craig, Robert | 012090 |
| - | Tanner, Dave | 002263 |
| ⋮ | ⋮ | ⋮ |
| Runner | Rasor, Gregg | 000106 |

CALENDAR DRIVEN SELECTIVE CALL MESSAGING SYSTEM AND OPERATING METHOD

FIELD OF THE INVENTION

This invention relates in general to selective call messaging systems and more particularly to a calendar driven selective call messaging system.

BACKGROUND OF THE INVENTION

Selective call communication (paging) systems typically comprise a radio frequency transmitter/encoder (base station) that is accessed via a link to the Public Switched Telephone Network (PSTN) and a radio receiver (e.g., a selective call receiver or the like) that has at least one unique call address associated therewith. Operationally, the selective call receiver receives and decodes information transmitted from the base station, the information including an address and possibly a data or voice message. When the selective call receiver detects its address, it may alert a user and present message information received.

To implement messaging capability in a paging system, the address and message information referred to are encoded and subsequently transmitted using a protocol such as GSC (Motorola's Golay Sequential Code) or POCSAG (a code from Great Britain's Post Office Code Standardisation Advisory Group). These protocols are adapted to reliably communicate messages to at least one selective call receiver and are well known to one of ordinary skill in the art of Paging systems. A typical selective call message may consist of an address signal if the message is a tone only message, or an address signal and a data packet if the message is a data message.

Present selective call messaging systems transmit either voice or a keypad entered messages primarily input via the telephone. Furthermore, entry of these messages is completely manual, that is, you must physically enter (or input) the message information each time you want to send a message. This method is not only inconvenient, but it is inefficient. In this case, the user must not only remember the cap-code or pager address of the subscriber's selective call receiver (pager), but they must also, when dealing with multiple message recipients, re-enter the message for each transaction.

Another disadvantage of contemporary selective call signaling systems and entry formats is that their complete utility is not afforded to a subscriber. This comes about because of limited paging entry means and a complete lack of a deferred scheduling function. This effectively eliminates using a selective call receiver as a proactive notification means, thus relegating it to serve as an "after the fact" notification device.

Consequently, what is needed is an apparatus and method that allows convenient entry, storage, transmission, and future transmission of selective call messages to be broadcast by a paging system.

SUMMARY OF THE INVENTION

Briefly, according to the invention, there is provided an electronic information processing device capable of communicating at least one message to a paging terminal. The electronic information processing device comprises input means for entering the at least one message, selecting at least one messaging subscriber and their corresponding selective call address identifier, and scheduling communication of the at least one message to the paging terminal for transmission to at least one selective call receiver corresponding to the at least one selected messaging subscriber. A microcontroller associated with the electronic information processing device includes at least one electronic memory and a processor for executing a microcode program that controls operation of the electronic information processing device, maintains a registry of messaging subscribers in the at least one electronic memory, and implements a real-time calendar for effecting communication of an information signal to the paging terminal in response to a scheduled communication of the at least one message. The information signal comprises the selective call address identifier and the at least one message. Additionally, the electronic information processing device comprises a data port coupled to the microcontroller for communicating the information signal to the paging terminal.

The electronic information processing device operates using a method comprising the steps of entering the at least one message; selecting a destination for the entered message, the destination being at least one messaging subscriber from a registry of messaging subscribers maintained in at least one electronic memory coupled to the electronic information processing device; automatically determining from the registry a selective call address identifier corresponding to the selected at least one messaging subscriber; scheduling communication of the entered message to the paging terminal for transmission to the selected messaging subscriber; and communicating an information signal to the paging terminal in response to the scheduled communication of the entered message, the information signal comprising the selective call address identifier and the entered message.

DESCRIPTION OF A PREFERRED EMBODIMENT

Figure 1:
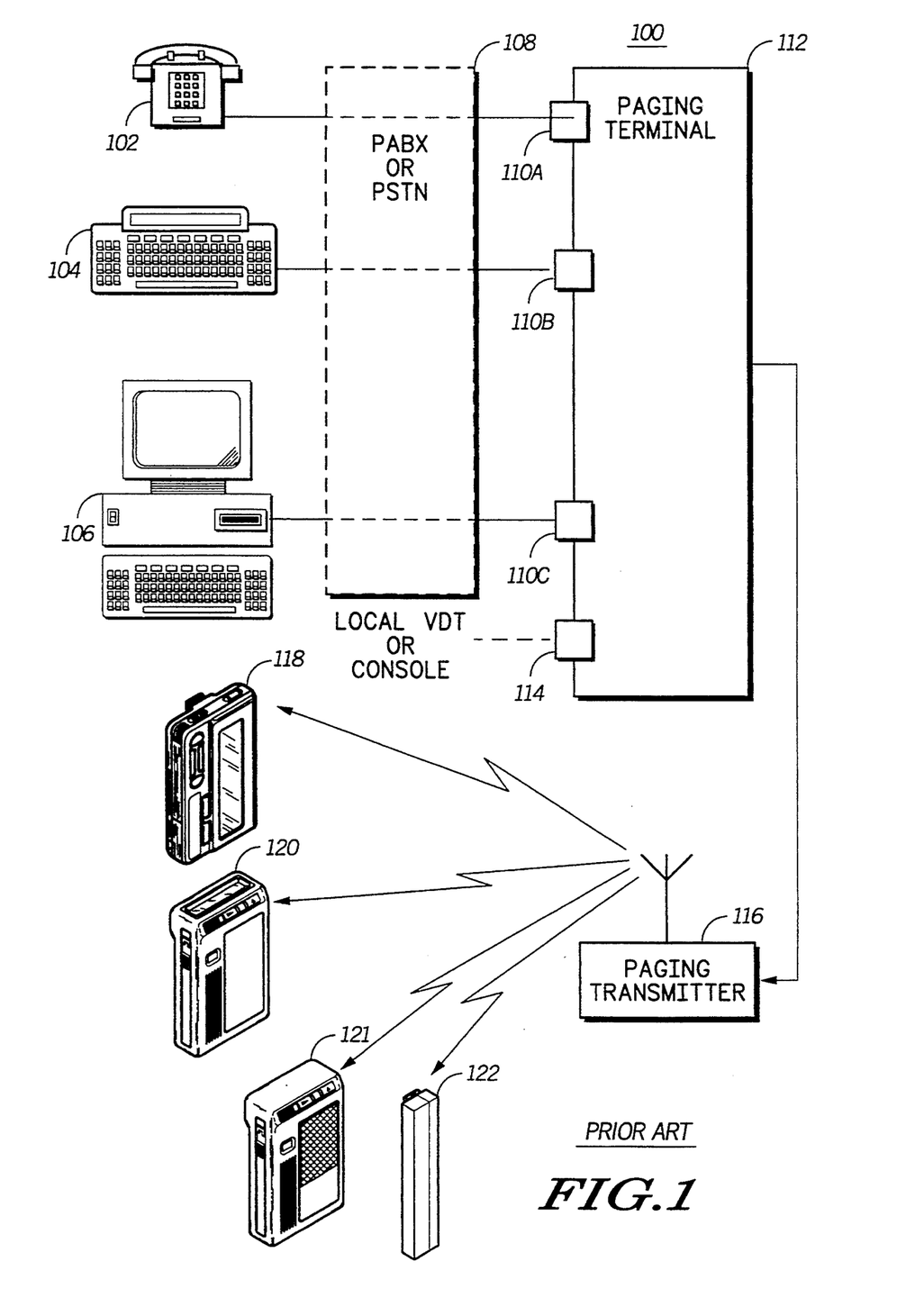
FIG. 1 is a block diagram of a conventional selective call communication system configured for operation in accordance with the present invention.

Referring to FIG. 1, a communication system (e.g., a paging system 100), accepts a page request from several different sources (e.g., a telephone 102, a page entry terminal device 104, and a computer with modem 106). The page request is normally accepted through a public or a private telephone network 108, which couples the page request from one of the sources (i.e., callers) to an automatic telephone input (110A, 110B, or 110C) at a paging terminal 112. Optionally, a dedicated input 114 at the paging terminal 112 can accept a page request from a local video display terminal or console. The dedicated input 114 is usually associated with a telephone switchboard and message dispatch service that accepts the page request from a telephone caller and enters the page request into the paging terminal 112 typically via the video display terminal.

After accepting the page request, the paging terminal 112 encodes and transmits, via a conventional transmitter 116, a page to a selective call receiver (e.g., a pager). Conventional paging systems may convey information from a caller to a pager user via a plurality of message formats. These message formats are commonly referred to as message sources, each of which denotes a mode of data (e.g., characters, numbers, audio, graphics, or "just a beep") being sent to the pager. FIG. 1 illustrates a number of conventional selective call receivers that may convey information to the pager user via either an alphanumeric display message page 118, a numeric display message page 120, a voice message page 121, or a tone only page 122. In the latter case, the tone only page 122 (i.e., no message page), alerts (e.g., an audible beep), the user that a caller wants the pager user to respond by calling a prearranged telephone number, such as a receptionist telephone number.

A conventional selective call receiver commonly receives a page, alerts the pager wearer, and optionally presents the message information according to a message format that is mapped to a pager address on the paging system. The unique pager address typically represents the message format (e.g., alphanumeric, numeric, voice, or tone-only), supported by the selective call receiver. Therefore, by matching the unique pager address with the appropriately formatted message, a page with a specific message format may be effectively transmitted to the selective call receiver by the paging terminal 112.

Modern selective call receivers may be capable of receiving and presenting message information in a plurality of formats, typically using separate pager addresses mapped to the same selective call receiver. When more than one format is supported by a selective call receiver, there may be several unique sources (paging addresses) associated with the receiver that allow correct reception of different message formats. For example, one pager address may be mapped to a numeric display message format and a second pager address may be mapped to a voice message format. Therefore, information may be conveyed from a caller to the pager user in either numeric display message format or voice message format.

Hence, the aforementioned communication system 100 is capable of receiving message information in a plurality of formats. The message formats are mapped to unique pager addresses supported by the communication system. Where more than one pager address and message format pairs are mapped to the same selective call receiver, information may be conveyed from a caller to a pager user in a plurality of message formats (e.g., alphanumeric display, numeric display, and voice).

Figure 2:
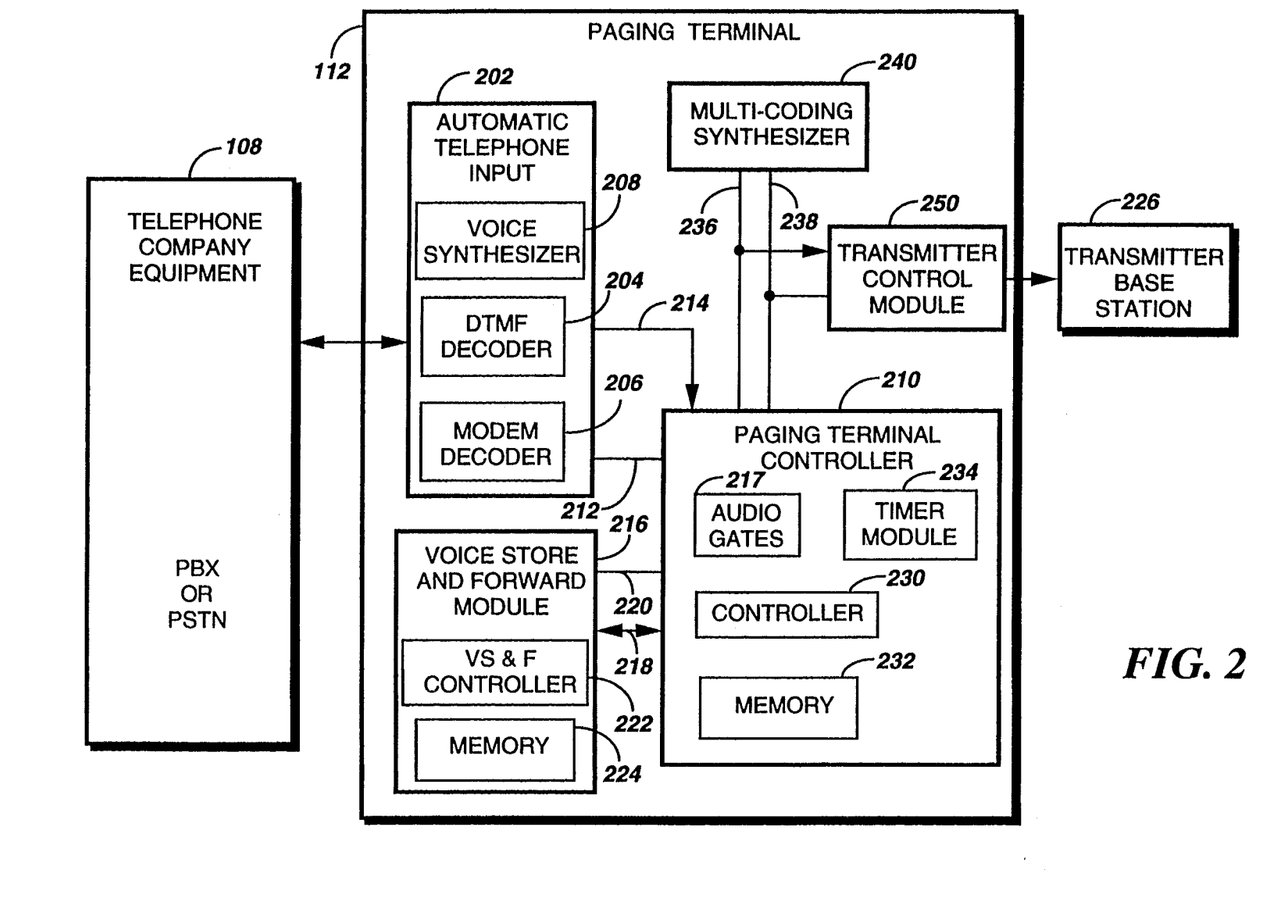
FIG. 2 is a block diagram of a paging terminal in accordance with the preferred embodiment of the present invention.

Referring to FIG. 2, a block diagram of a communication system (e.g., a paging system) comprising a paging terminal 112 is shown in accordance with an embodiment of the present invention. The paging terminal 112 interfaces with telephone company equipment 108 via at least one automatic telephone input 202. A caller may enter a page request into the communication system using conventional DTMF communication 204 or modem communication 206. Optionally, a voice synthesizer 208 may present a synthesized voice at the telephone interface, and thereby prompt the caller through the page request entry process. Alternately, the caller may be conventionally prompted using tones at the telephone interface.

The automatic telephone input 202 communicates the page request information to a paging terminal controller 210 via an input control bus 212 and optionally an input audio bus 214. The input audio bus 214 routes a voice message from the caller into the paging system, for systems capable of handling voice message pages. Since a paging channel and its associated transmitter 226 may not always be available to communicate the incoming page request immediately to a selective call receiver (not shown), the paging terminal controller 210 may temporarily transfer the voice message information to an optional voice store and forward (VS&F) module 216 using audio gates 217, a voice store and forward audio bus 218 and a voice store and forward control bus 220. The voice store and forward module 216 comprises a VS&F controller circuit 222 and associated memory 224 for storing the incoming voice messages and subsequently retrieving and playing them back as part of the voice message pages, under control of the paging terminal controller 210. The storing and retrieving process may be preferably done using a known linear predictive coding (LPC) or a continuously variable slope delta modulation (CVSD) algorithm in the voice store and forward module 216. In this way, the paging terminal 112 may optionally use the voice store and forward module 216 to integrate the arrival times of the incoming voice message page requests with the availability of the paging channel, thereby optimally utilizing the channel capacity.

The paging terminal controller 210 may comprise a controller circuit 230 and associated memory 232, such that an incoming page request may be accepted and stored into available memory 232 for subsequent transmission to a selective call receiver (e.g., as designated by a unique pager address and a message information format for the particular select call receiver). When a page request is received from a caller, the paging terminal controller 210 verifies the requested selective call address identifier and coupled message information format. By comparing the paging request information to a local database of valid pager addresses and message information formats, the paging terminal controller 210 is capable of instructing the automatic telephone input 202 for the required prompting to the caller. Additionally, the accepted page request information may be transferred from the automatic telephone input to the paging terminal controller 210 via the input control bus 212, and stored into a designated area of memory 232. The stored page information typically comprises a pager address. However, it may include a numeric display message or an alphanumeric display message, formatted to the requirement of the particular page request using known coding schemes (e.g., POCSAG and GOLAY sequential). In the event of a voice message page, as discussed earlier, the voice message may be stored into a designated area of voice store and forward memory 224, with the pager address and required linking information stored into the area of paging terminal controller memory 232, as may be necessary to subsequently construct the voice message page for transmission to a selective call receiver. Therefore, a selective call address identifier may be received and accepted by the paging terminal 112, and the corresponding data (or message) stored into a designated area of memory (e.g., either the VS&F memory 224 or the paging terminal controller memory 232), and subsequently transmitted to a selective call receiver subject to the availability of the paging channel.

A timer module 234 may be used by the paging terminal controller 210 to perform timed functions for the paging system. Many tasks within the paging terminal 112 require predetermined time intervals. For example, in accepting a selective call address identifier, typically a signal from a caller to terminate the paging request entry process may be either a particular information received from the caller or a predetermined inactivity time interval (e.g., a time interval with no communication detected from the caller).

Once a display message page (e.g., alphanumeric display message page or numeric display message page) is ready to be sent to a selective call receiver, a multi-coding synthesizer module 240 receives the pager address information and the formatted display message from the memory module 232 (e.g., typically via an output control bus 238). The display pager address information instructs the multi-coding synthesizer module 240 as to what pager address and type of pager encoding is needed (e.g., POCSAG or GOLAY sequential) to effectively transmit the display message page to the selective call receiver.

As can be appreciated by one of ordinary skill in the art, the preferred embodiment of the instant invention can be realized using any selective call signaling protocol capable of delivering data messages, not only the POCSAG protocol used in this example. This flexibility allows for unlimited future expansion into alternative high speed, high efficiency signaling protocols.

The paging terminal controller 210 finally instructs the transmitter control module 250 (i.e., via the output control bus 238), to turn "on" the transmitter base station 226 and begin transmitting over the paging system channel. The multi-coding synthesizer module 240 is typically responsible for sending the encoded message information to the transmitter base station 226 (i.e., typically via an output audio bus 236 and through the transmitter control module 250), which broadcasts the message information over the paging system channel.

Figure 3:
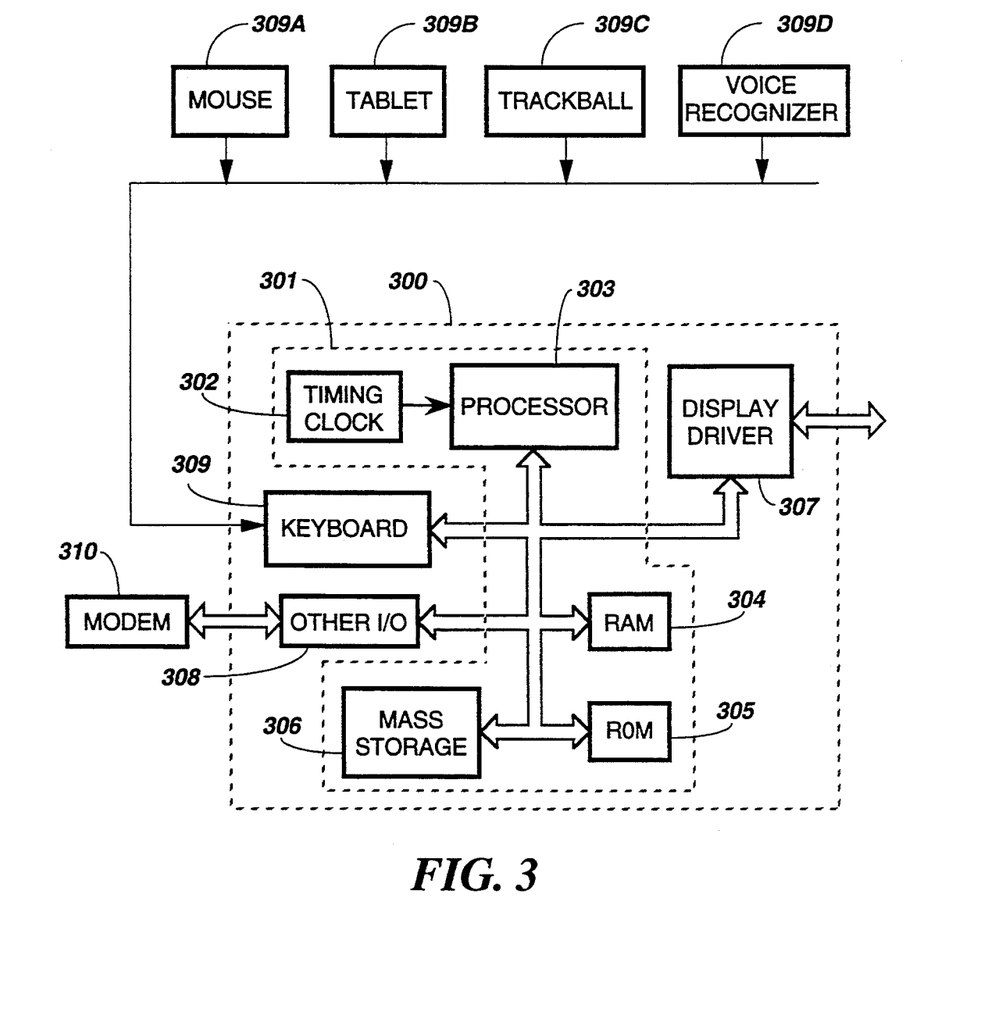
FIG. 3 illustrates an electronic information processing device configured for operation in accordance with the preferred embodiment of the present invention.

Referring to FIG. 3, the illustration shows a electronic information processing device 300 configured for operation in accordance with the preferred embodiment of the present invention. The electronic information processing device 300 may encompass any number of devices such as a dedicated pocket paging assistant, a personal computer, an electronic pocket organizer, a laptop computer, or the like. As illustrated, the electronic information processing device 300 minimally comprises a micro-controller 301 with a system timing clock 302, central processing unit 303, electronic memory in the form of random access memory (RAM) 304, read only memory (ROM) 305, mass storage (e.g., a disk drive or the like) 306; display driver 307, general I/O interface or data port 308, and an interface 309 that accommodates any number of input means for general information entry. In the preferred embodiment, the electronic information processing device's information input means, e.g., a keyboard 309, a "mouse," 309A a pen or puck activated tablet 309B, a trackball 309C, an audio activated command recognition processor 309D, or the like, allows a user to enter and manipulate information. After information is entered, it may be communicated to the paging terminal 112 via a conventional modem 310 or the like.

The system formed by the elements depicted in FIG. 1, FIG. 2, and FIG. 3 realizes many advantages over prior art selective call messaging systems. The electronic information processing device 300 can be commanded to automatically send pre-stored messages to a selective call messaging subscriber as reminders for meetings, appointments, or the like. Since the electronic information processing device includes both messaging capability and a timer/scheduling function, the electronic information processing device may be used as a reminder system. For instance, this system would eliminate the problem of being away from a fixed scheduling device (e.g., your desktop or mainframe computer running office automation software) The electronic information processing device 300, having a real-time clock and calendar, can be programmed to send recurring messages to a selective call messaging subscriber for regularly scheduled events. In the case of a businessman that travels, one may even schedule an automatic "wake-up" selective call message to be broadcast to the traveler using a wide area paging service in conjunction with his secretary's electronic information processing device 300. Moreover, when the electronic information processing device 300 is implemented in a personal computer or the like, a user may originate selective call messages including data generated by a conventional software application (e.g., a financial spreadsheet, drawing program, or the like).

Figure 4:
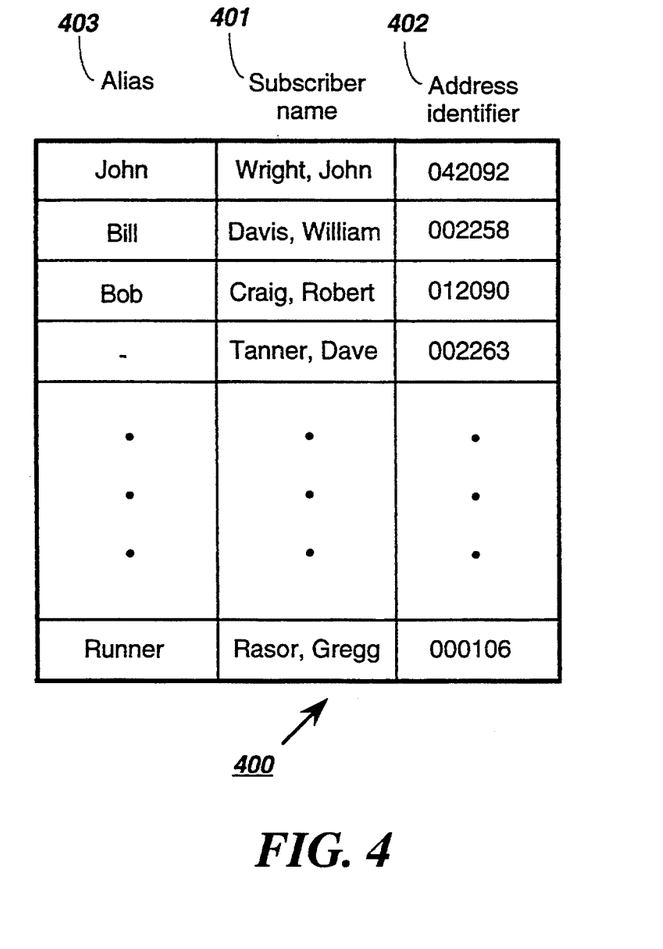
FIG. 4 illustrates a registry of messaging subscribers used by the electronic information processing device to effect messaging in accordance with the preferred embodiment of the present invention.

Referring to FIG. 4, the illustration shows a registry of messaging subscribers 400 used by the electronic information processing device 300 to effect messaging in accordance with the preferred embodiment of the present invention. The electronic information processing device 300 maintains a registry of paging subscribers comprising a subscriber name 401 or alias 403 and a corresponding selective call address identifier 402 that may include multiple source identifiers. As discussed earlier, source identifiers denote a mode of data (e.g., characters, numbers, audio, graphics, or "just a beep") being sent to the pager.

Figure 5:
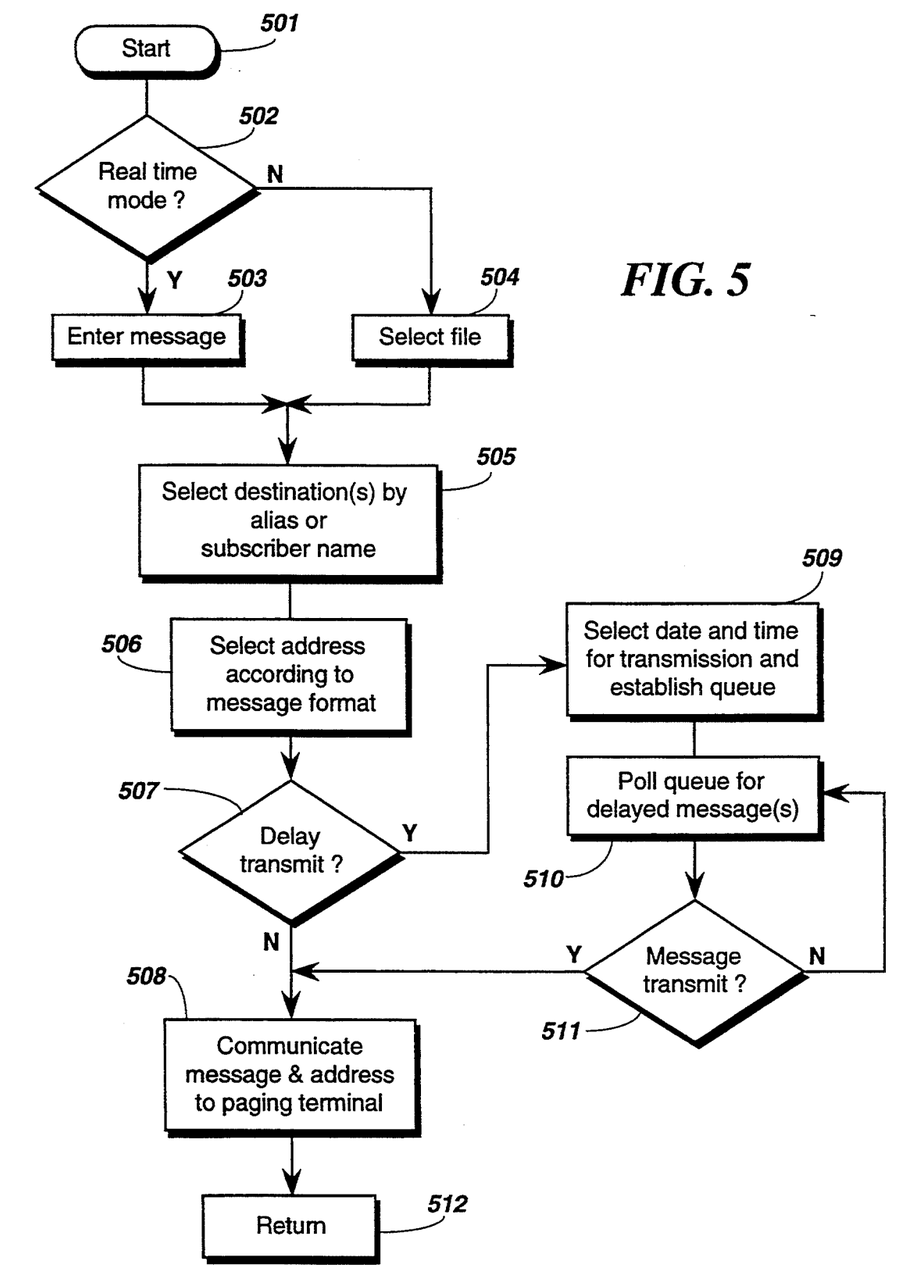
FIG. 5 is an exemplary flow diagram illustrating a preferred method of operation for the electronic information processing device in accordance with the preferred embodiment of the present invention.

Referring to FIG. 5, the flow diagram illustrates a preferred method of operation for the electronic information processing device in accordance with the preferred embodiment of the present invention. In the origination or sending mode 501, if a user registered in the electronic information processing device 300 wishes to send a message to a selective call receiver, the user enters a message 503 then selects a destination for that message 505. Obviously, a user may first select the destination 505 then enter the message 503, but this operational sequence is awkward for most people. After entering the at least one message 503 and selecting at least one messaging subscriber 505 via a subscriber name or alias 401, the electronic information processing device 300 will automatically select the selective call address identifier corresponding with the at least one messaging subscriber 506. This is possible because the registry of messaging subscribers, which may be pre-programmed by a service provider, or by the end-user, relates the subscriber name or alias 401 of the at least one messaging subscriber directly to the selective call address identifier appropriate for the data mode selected. The electronic information processing device 300 then process the information in a conventional manner and stores the information as a selective call address identifier and a corresponding message.

At this point, the user may select whether to communicate the stored information immediately or to queue the stored information for later transmission 507. In the first case, the user would execute a transmission command and the electronic information processing device 300 would communicate the message information to a paging service for broadcast to the appropriate selective call receiver(s) 508. In the latter case, the user would select one or more times 509 at which the electronic information processing device 300 will communicate at least one selected message to at least one messaging subscriber. The electronic information processing device 300 may, after communicating the selected message to a paging terminal, delete the selected message or keep it in storage for future transmission.

Alternatively, a personal computer (PC) acting as the electronic information processing device 300 can provide a convenient method of sending messages to a pager. A memory resident (or multitasking) messaging program is loaded and executed on the PC. This program utilizes the system's real time clock to schedule 509 and execute 510, 511 user programmable events that result in information pages to at least one user in at least one paging group. In one embodiment, this function may be used to implement an appointment reminder system. Also, by the virtue that the program is running at all times, the PC can originate a page to a selected user (or users) including a message that is entered upon being prompted by the program. The message can be chosen from either a "type and send" format 502, 503 (real time entry, buffered send) or a specific PC file that was created at an earlier time 502, 504. The specific PC files (e.g., memos, drawings, etc.) may comprise data such as text or graphics already stored in files on the PC. Moreover, the PC can also condition data stored in its files using filters (programs to convert PC data files for over-the-air transmission). The filters act as preprocessors that adapt the PC's internal data format to a format that is acceptable for communication to a pager. With the use of modular filters for the conversion of PC data, the realm of information can range from plain numeric characters (an ASCII file) to compressed audio or video information. When sending a PC file, the PC may condition the information before transmission for correct presentation by the pager once received. Alternatively, the paging terminal 112 may be adapted to recognize specific data formats and perform message format processing upon receipt of a queued selective call message. Using a PSTN connection or equivalent transmission means, the paging information is sent to a paging terminal for broadcast to the paging receiver and the process terminates 512.

Another advantage of the electronic information processing device 300 is that it may function as an electronic appointment calendar in conjunction with a selective call receiver. In this embodiment, the user enters the at least one message in a personal appointment calendar, the at least one message including at least a date and time for an appointment. The user then selects a destination for the at least one message and all other messages entered in the personal appointment calendar, the destination being a messaging subscriber to which the personal appointment calendar belongs, and the messaging subscriber being selected from a registry of messaging subscribers maintained in at least one electronic memory coupled to the electronic information processing device. The electronic information processing device 300 then automatically determines from the registry a selective call address identifier corresponding to the selected messaging subscriber. Furthermore, the electronic information processing device 300 schedules communication of the entered message to the paging terminal for transmission to the selected messaging subscriber in response to the date and time entered in each entry of the appointment calendar. Lastly, the electronic information processing device 300 communicates an information signal to the paging terminal in response to the scheduled communication of the entered message, the information signal comprising the selective call address identifier and the entered message.

To further enhance the utility offered when using the electronic information processing device 300 as an appointment calendar, the user may select a pre-notification time offset that functions to schedule communication of the information signal to the paging terminal earlier than the date and time originally entered for an appointment. For example, you may want to be notified fifteen minutes before an appointment or meeting so you can prepare or gather information pertinent to the meeting.

As can be appreciated by one or ordinary skill in the art, this invention can be realized in a number of embodiments of which the disclosed embodiment is only one of many equivalent alternatives.

What is claimed is:

1. An electronic information processing device for communicating at least one message to a paging terminal, the electronic information processing device comprising:

input means for entering the at least one message, selecting at least one messaging subscriber and their corresponding selective call address identifier, and scheduling communication of the at least one message to the paging terminal for transmission to at least one selective call receiver corresponding to the at least one selected messaging subscriber;

a microcontroller coupled to the input means and including at least one electronic memory and a processor for executing a microcode program that controls operation of the electronic information processing device, maintains a registry of messaging subscribers in the at least one electronic memory, and implements a real-time calendar for effecting communication of an information signal to the paging terminal in response to a scheduled communication of the at least one message, the information signal comprising the selective call address identifier and the at least one message; and a data port coupled to the microcontroller for communicating the information signal to the paging terminal.

2. The electronic information processing device according to claim 1 further comprising:

a modem coupled to the data port, the modem operating to modulate and transmit the information signal to the paging terminal.

3. The electronic information processing device according to claim 1 wherein the electronic memory comprises a semiconductor memory coupled to the microcontroller for storing and retrieving data comprising the registry of messaging subscribers and the at least one message in the semiconductor memory.

4. The electronic information processing device according to claim 1 wherein the electronic memory comprises a disk based mass storage device coupled to the microcontroller for storing and retrieving data comprising the registry of messaging subscribers and the at least one message in the disk based mass storage device.

5. The electronic information processing device according to claim 1 wherein the input means comprises a keyboard.

6. The electronic information processing device according to claim 1 wherein the input means comprises a mouse.

7. The electronic information processing device according to claim 1 wherein the input means comprises a tablet.

8. The electronic information processing device according to claim 1 wherein the input means comprises a trackball.

9. The electronic information processing device according to claim 1 wherein the input means comprises an audio activated command recognition processor.

10. The electronic information processing device according to claim 1 wherein the registry of messaging subscribers comprises:
   an alias for each of the at least one messaging subscribers.

11. The electronic information processing device according to claim 1 wherein the registry of messaging subscribers comprises:
   a selective call messaging source address denoting one of a tone-only, numeric, alphanumeric, graphic, or voice messaging mode corresponding with the selected selective call address identifier.

12. A personal computer for communicating at least one message to a paging terminal, the personal computer comprising:
   a keyboard for entering the at least one message, selecting at least one messaging subscriber and their corresponding selective call address identifier, and scheduling communication of the at least one message to the paging terminal for transmission to at least one selective call receiver corresponding to the at least one selected messaging subscriber;
   a microcontroller coupled to the keyboard and including at least one electronic memory and a processor for executing a microcode program that controls operation of the personal computer, maintains a registry of messaging subscribers in the at least one electronic memory, and implements a real-time calendar for effecting communication of an information signal to the paging terminal in response to a scheduled communication of the at least one message, the information signal comprising the selective call address identifier and the at least one message; and
   a data port coupled to the microcontroller for communicating the information signal to the paging terminal.

13. The personal computer according to claim 12 wherein the electronic memory comprises a semiconductor memory coupled to the microcontroller for storing and retrieving data comprising the registry of messaging subscribers and the at least one message in the semiconductor memory.

14. The personal computer according to claim 12 wherein the electronic memory comprises a disk based mass storage device coupled to the microcontroller for storing and retrieving data comprising the registry of messaging subscribers and the at least one message in the disk based mass storage device.

15. The personal computer according to claim 12 wherein the registry of messaging subscribers comprises:
   an alias for each of the at least one messaging subscribers.

16. The personal computer according to claim 12 wherein the registry of messaging subscribers comprises:
   a selective call messaging source address denoting one of a tone-only, numeric, alphanumeric, graphic, or voice messaging mode corresponding with the selected selective call address identifier.

17. In an electronic information processing device for communicating at least one message to a paging terminal, a method comprising the steps of:
   entering the at least one message;
   selecting a destination for the entered message, the destination being at least one messaging subscriber from a registry of messaging subscribers maintained in at least one electronic memory coupled to the electronic information processing device;
   automatically determining from the registry a selective call address identifier corresponding to the selected at least one messaging subscriber;
   scheduling communication of the entered message to the paging terminal for transmission to the selected messaging subscriber; and
   communicating an information signal to the paging terminal in response to the scheduled communication of the entered message, the information signal comprising the selective call address identifier and the entered message.

18. In an electronic information processing device for communicating at least one message to a paging terminal, a method comprising the steps of:
   entering the at least one message in a personal appointment calendar, the at least one message including at least a date and time for an appointment;
   selecting a destination for the at least one message and all other messages entered in the personal appointment calendar, the destination being a messaging subscriber to which the personal appointment calendar belongs, the messaging subscriber being selected from a registry of messaging subscribers maintained in at least one electronic memory coupled to the electronic information processing device;
   automatically determining from the registry a selective call address identifier corresponding to the selected messaging subscriber;
   scheduling communication of the entered message to the paging terminal for transmission to the selected messaging subscriber at the date and time specified in the at least one message; and
   communicating an information signal to the paging terminal in response to the scheduled communication of the entered message, the information signal comprising the selective call address identifier and the entered message.

19. The method according to claim 18 wherein the scheduling step further comprises the step of:
   selecting a pre-notification time offset that functions to schedule communication of the information signal to the paging terminal earlier than the date and time originally entered for an appointment.

20. The personal computer according to claim 12 further comprising:
   a modem coupled to the data port, the modem operating to modulate and transmit the information signal to the paging terminal.

* * * * *